US 12,150,436 B2
Nov. 26, 2024

(12) United States Patent
Flora et al.

(54) AQUARIUM SYSTEM WITH CONTROLLABLE LIGHT AND METHODS

(71) Applicant: Spectrum Brands, Inc., Middleton, WI (US)

(72) Inventors: Joe Flora, Simi Valley, CA (US); John Edward Fox, Jr., Blacksburg, VA (US); Joseph Roark, Riner, VA (US); Chad Robbins, Moorpark, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,849

(22) Filed: Dec. 4, 2023

(65) Prior Publication Data

US 2024/0130337 A1    Apr. 25, 2024

Related U.S. Application Data

(63) Continuation of application No. 18/110,687, filed on Feb. 16, 2023, now Pat. No. 11,864,540, which is a continuation of application No. 17/429,589, filed as application No. PCT/US2020/016742 on Feb. 5, 2020, now Pat. No. 11,606,939.

(60) Provisional application No. 62/804,014, filed on Feb. 11, 2019.

(51) Int. Cl.
*A01K 63/06* (2006.01)
*F21W 131/308* (2006.01)
*F21Y 115/10* (2016.01)
*F21V 9/08* (2018.01)
*F21V 23/04* (2006.01)

(52) U.S. Cl.
CPC ............... *A01K 63/06* (2013.01); *F21V 9/08* (2013.01); *F21V 23/04* (2013.01); *F21W 2131/308* (2013.01); *F21Y 2115/10* (2016.08)

(58) Field of Classification Search
CPC ..................... A01K 63/06; F21W 2131/308
See application file for complete search history.

(56) References Cited

U.S. PATENT DOCUMENTS

| | | | |
|---|---|---|---|
| 3,572,291 A | 3/1971 | Edgar | |
| 5,365,886 A | 11/1994 | Frost, Jr. | |
| 5,413,070 A | 5/1995 | Dewalt | |
| 10,154,657 B2 | 12/2018 | Grajcar et al. | |
| 2007/0253196 A1 | 11/2007 | Ormiston | |

(Continued)

FOREIGN PATENT DOCUMENTS

| CN | 202524917 U | 11/2012 |
|---|---|---|
| JP | 2007166911 A | 7/2007 |

(Continued)

OTHER PUBLICATIONS

International Search Report and Written Opinion for PCT/US2020/016742, mailed May 19, 2020.

*Primary Examiner* — Alexander K Garlen
(74) *Attorney, Agent, or Firm* — Merchant & Gould P.C.

(57) ABSTRACT

An aquarium system includes an aquarium tank arrangement and a light source. The light source has a controllable output of colored light projecting into the aquarium tank arrangement. The light source can provide a cycle of projecting light of at least two different colors.

5 Claims, 4 Drawing Sheets

(56) References Cited

U.S. PATENT DOCUMENTS

| | | |
|---|---|---|
| 2013/0152864 A1 | 6/2013 | Grajcar et al. |
| 2014/0251932 A1 | 9/2014 | Lutz et al. |
| 2015/0116997 A1 | 4/2015 | Tappert et al. |
| 2015/0163888 A1 | 6/2015 | Fredricks |
| 2015/0342159 A1 | 12/2015 | Shaw |
| 2016/0050893 A1 | 2/2016 | Lari |
| 2017/0071142 A1 | 3/2017 | Jung et al. |
| 2017/0086430 A1 | 3/2017 | Wills et al. |
| 2018/0132320 A1 | 5/2018 | Fredricks et al. |
| 2019/0141964 A1 | 5/2019 | Perslow et al. |
| 2019/0261607 A1 | 8/2019 | Owens et al. |
| 2020/0121097 A1* | 4/2020 | Lutz ................ A47F 3/001 |

FOREIGN PATENT DOCUMENTS

| | | |
|---|---|---|
| JP | 2012179007 A | 9/2012 |
| KR | 101864049 B1 | 6/2018 |

* cited by examiner

AQUARIUM SYSTEM WITH CONTROLLABLE LIGHT AND METHODS

This application is a continuation of U.S. patent application Ser. No. 18/110,687, filed Feb. 16, 2023, which is a continuation of U.S. patent application Ser. No. 17/429,589, filed Aug. 9, 2021, now U.S. Pat. No. 11,606,939, which is a U.S. National Stage application of PCT International patent application No. PCT/US2020/016742, filed Feb. 5, 2020, which claims priority to U.S. Provisional Patent Application No. 62/804,014, filed Feb. 11, 2019, which applications are incorporated herein by reference. To the extent appropriate, a claim of priority is made to each of the above disclosed applications.

TECHNICAL FIELD

This disclosure concerns an aquarium system. In particular, this disclosure concerns an aquarium system including a light source with a controllable output of colored light and methods of use.

BACKGROUND

Aquarium systems are used for keeping live fish as pets. Aquarium systems are desirable that allow for the visual display of fish.

Retailers who sell pet fish desire to sell a variety, including standard goldfish, as well as more exotic fish, including glowing florescent fish. The retailer often displays the fish in display aquariums having rows and columns of individual tanks.

What is needed is a lighting system to allow for a selective variety of controllable light to give the retailer flexibility in their fish merchandising options.

SUMMARY

An aquarium system is provided that improves the prior art.

In one aspect, an aquarium system is provided including an aquarium tank arrangement; and a light source with controllable output of colored light projecting into the aquarium tank arrangement.

The light source may include a switch that actuates a cycle of projecting light of at least two different colors.

The light source can project light cycling between, for example, white light and blue light.

In some embodiments, the light source is mounted above the tank arrangement.

For many implementations, the aquarium tank arrangement includes a plurality of individual tanks positioned side-by-side, and the light source is positioned to project colored light in all of the individual tanks.

The light source can include a plurality of light emitting diodes (LEDs) within a fixture along a length of the tank arrangement positioned to project colored light in each of the individual tanks.

The light source can include a switch that actuates a cycle of projecting colors in the LEDs along predetermined distant increments along the length of the tank arrangement.

The light source can include a switch that actuates a cycle of projecting colors in the LEDs along predetermined time increments along the length of the tank arrangement.

The cycle can include emitting a first light color into at least a first of the individual tanks and, simultaneously, a second light color into at least a second of the individual tanks.

The cycle can include emitting the second light color into the first of the individual tanks and, simultaneously, the first light color into the second of the individual tanks.

In some example systems, the first color is white light, and the second color is blue light.

In some embodiments, the aquarium tank arrangement includes an array of individual tanks positioned in rows and columns; and the light source includes a plurality of light sources, at least one light source positioned for each row to project colored light in all of the individual tanks for the respective row.

In many implementations, the light source for each row includes a cycle of projecting colors along predetermined distance increments along the length of each row, and includes emitting a first light color into one or more of the individual tanks in the respective row and, simultaneously a second light color into one or more of the individual tanks in the respective row.

The light source for each row can be in a respective fixture mounted above each individual row.

The first color can be white light, while the second color can be a blue light.

In many implementations, the output of colored light is settable by an application executable on a mobile device.

In another aspect, a method of lighting an aquarium system is provided. The method includes projecting light into an aquarium tank arrangement having a plurality of tanks positioned side-by-side, the light having at least first and second different colors; and cycling the light to project the first color into a first of the tanks while projecting the second light color into a second of the tanks.

In some example methods, the step of cycling includes projecting the first light color into the second of the tanks, while projecting the second light color into the first of the tanks.

In some implementations, the plurality of tanks includes at least three tanks positioned side-by-side, and the step of cycling the light includes projecting the first light color in the first and second of the tanks, while projecting the second light into a third of the tanks.

The step of cycling can include changing the light color projecting into the tanks by a predetermined sequence.

In some example method, the first light color is white light, and the second light color is blue light.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that both the foregoing general description and the following detailed description are explanatory only, and are not restrictive of the claimed inventions.

DETAILED DESCRIPTION

Figure 1:
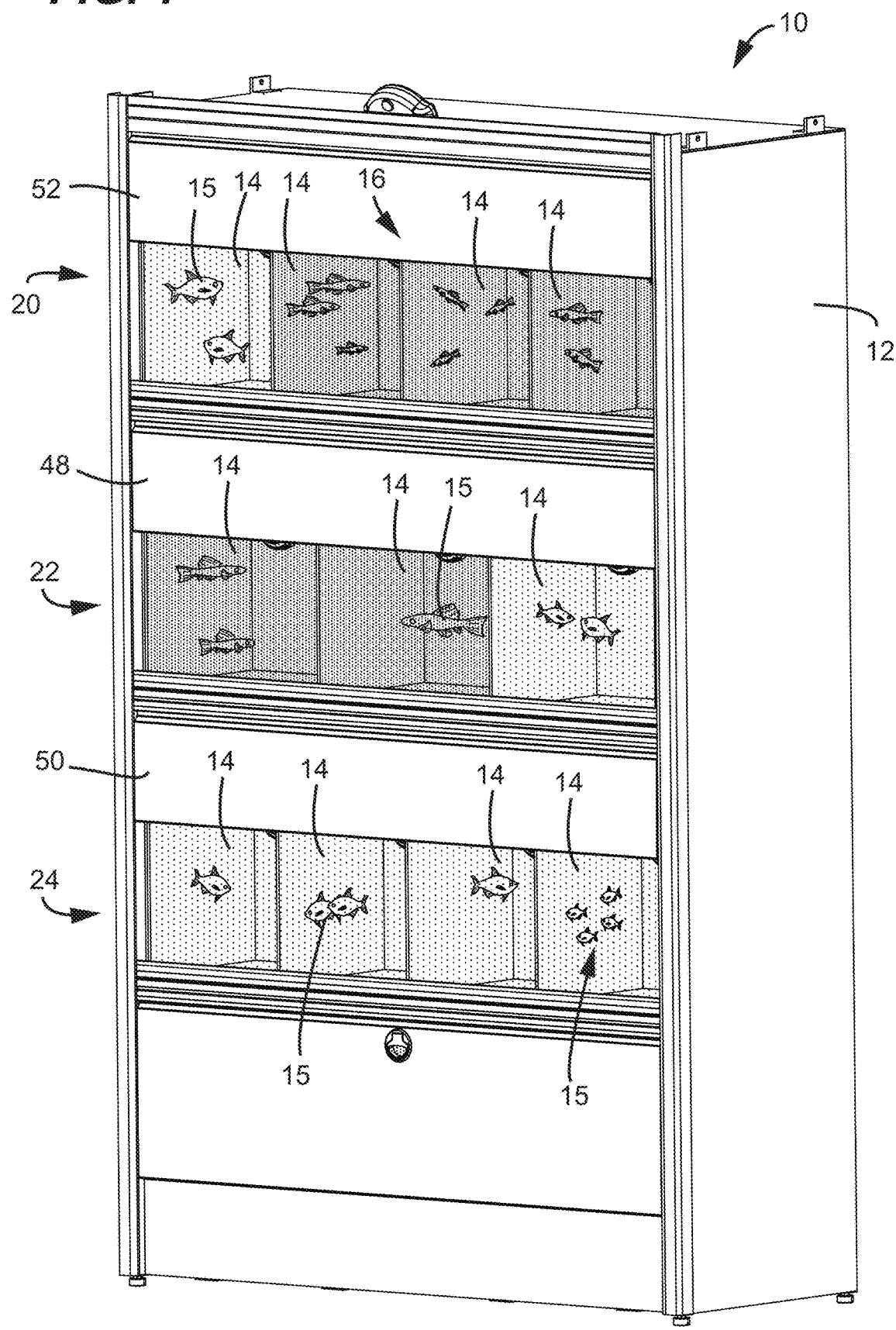
FIG. 1 is a perspective view of one embodiment of an aquarium system having a light source with a controllable output of colored light, constructed in accordance with principles of this disclosure.

Various examples will be described in detail with reference to the drawings, wherein like reference numerals represent like parts and assembly throughout the several views. Reference to various examples does not limit the scope of the claims attached hereto. Additionally, any examples set forth in this specification are not intended to be limiting and merely set forth some of the many possible examples for the appended claims.

FIG. 1 illustrates an aquarium system 10. While the aquarium system 10 can be embodied in many different forms, in the example shown, a cabinet 12 is provided. The cabinet 12 holds at least one, and in this example, several aquarium tanks 14. The cabinet 12 with the several tanks would be typical in a retail situation, such as a pet store selling fish 15.

The tanks 14 can be part of a tank arrangement 16. The tank arrangement 16 can be many different types, but in the embodiment shown, the arrangement 16 includes the tanks 14 positioned side-by-side. In addition, the side-by-side tanks 14 are positioned in a plurality of rows so that the arrangement 16 includes an array 18 of individual tanks 14 positioned in rows and columns.

Figure 2:
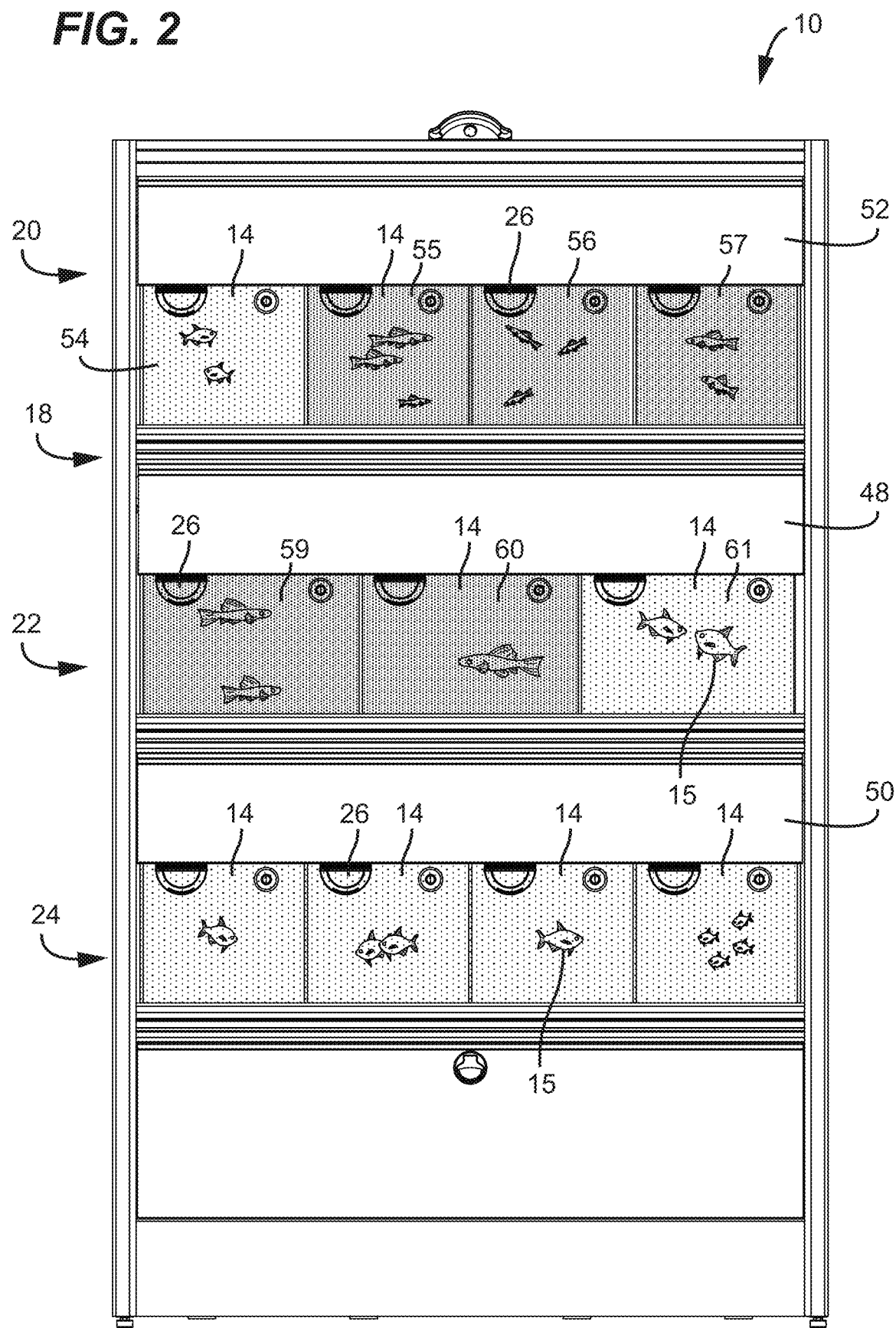
FIG. 2 is a front view of the aquarium system of FIG. 1.

FIG. 2 is a front view of the system 10. The array 18 of tanks 14 are shown in this example as including four tanks in an upper row 20, three tanks in a middle row 22, and four tanks in a bottom row 24. Again, many different arrangements are possible, and this is just one example.

Also visible in each of the tanks 14 in FIG. 2 is a surface skimmer 26. The surface skimmer 26 is located in each tank 14 for water clarity.

Figure 3:
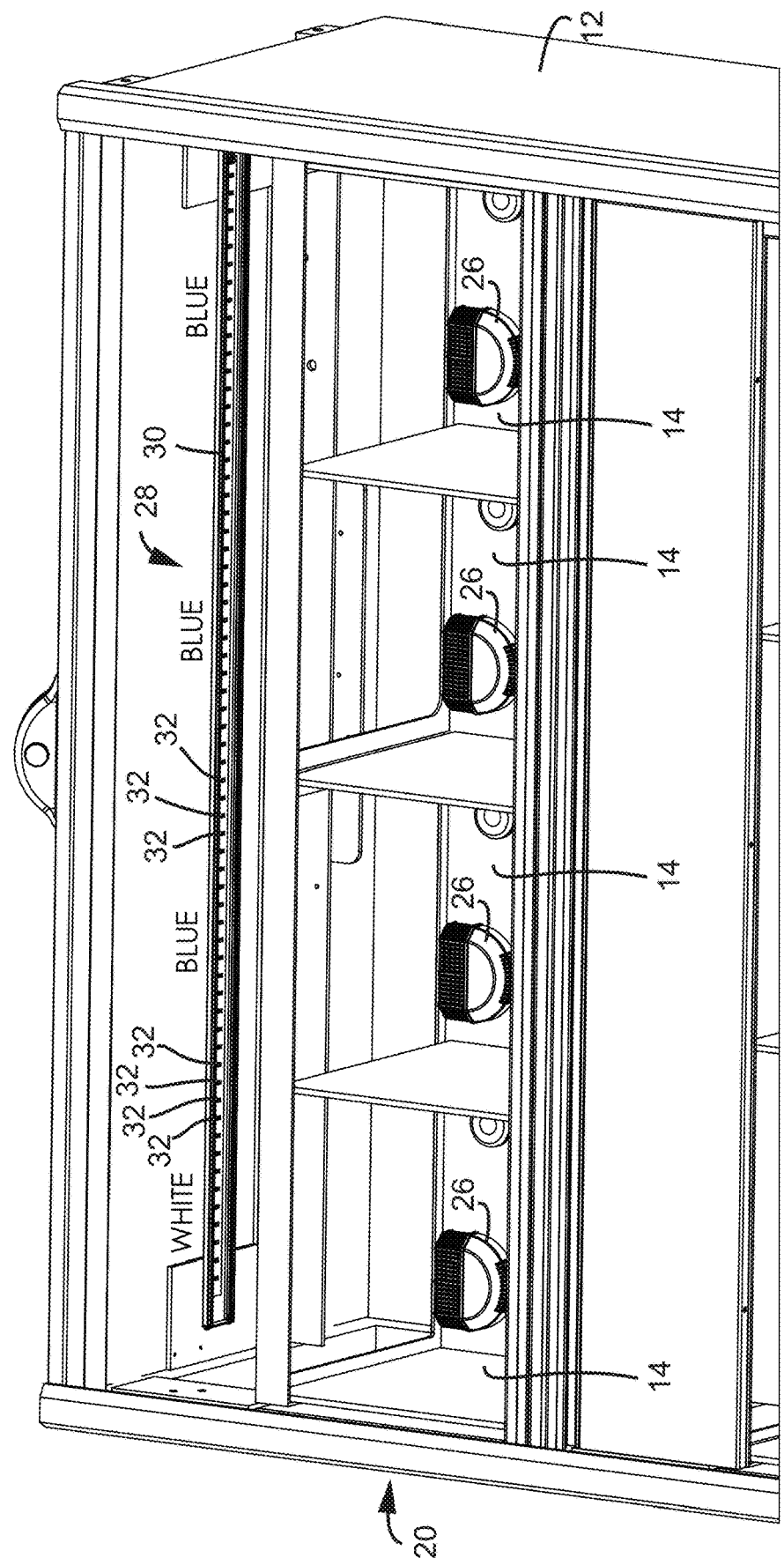
FIG. 3 is a perspective view of a portion of the aquarium system of FIG. 1, and showing the light source with the controllable output of colored light.

In accordance with principles of this disclosure, the aquarium system 10 includes a light source 28 (FIG. 3). The light source 28 has a controllable output of light projecting into the tank arrangement 16. In preferred embodiments, the controllable output of light includes a controllable output of colored light.

FIG. 3 illustrates the upper row 20 in the cabinet 12, but without water and fish in the tanks 14. As can be seen in the embodiment of FIG. 3 the light source 28 is mounted above the tank arrangement 16. In preferred embodiments, each of the rows 20, 22, and 24 includes the light source 28 mounted in its own respective light fixture 30 (FIG. 4) above each individual row 20, 22, 24. FIG. 3 also shows (with words) how the color of the light can vary in segments along a length of the light fixture 30. In FIG. 3, the left-most quarter of the fixture 30 is emitting white light, while the remaining three-quarters are emitting blue light.

Figure 4:
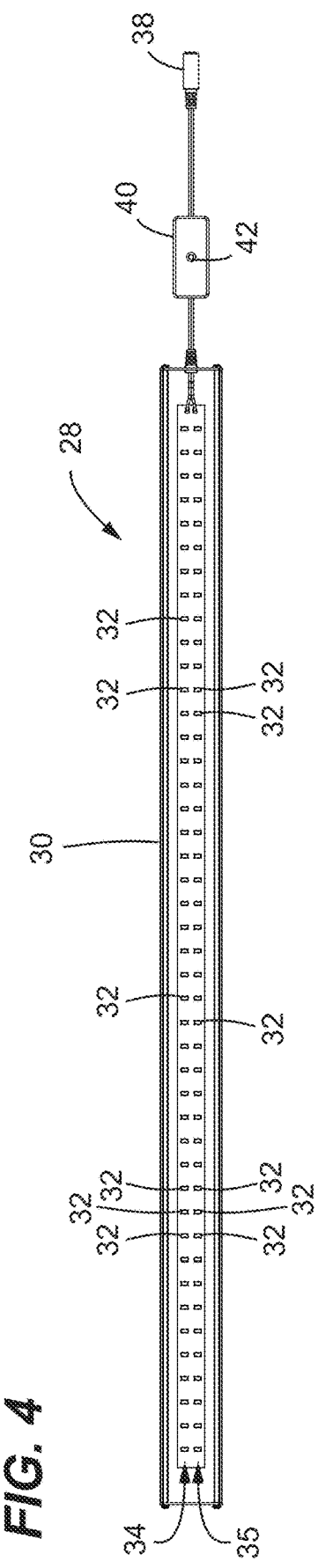
FIG. 4 is a plan view of one embodiment of a light fixture usable with the aquarium system of FIGS. 1-3.
Figure 5:
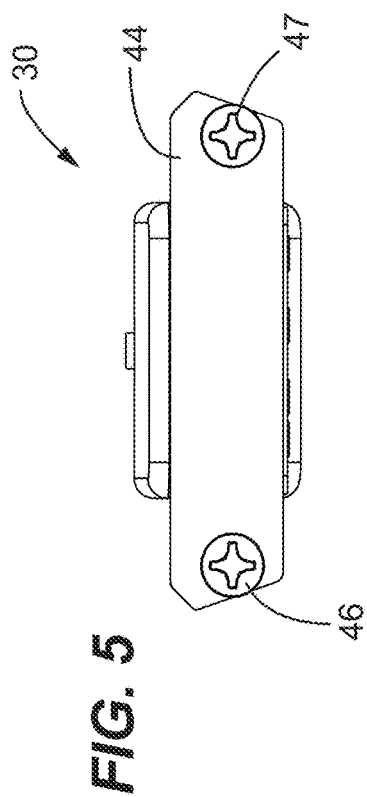
FIG. 5 is an end view of the light fixture of FIG. 4.

In reference now to FIGS. 4 and 5, one embodiment of the light fixture 30 for the light source 28 is illustrated. The fixture 30 includes a plurality of light emitting diodes 32 (LEDs) along the length of the fixture 30. While many different arrangements are possible, in the illustrated embodiment, there are two rows 34, 35 of diodes 32. Other arrangements can include more or fewer rows or different arrangements of the diodes 32. While LEDs are preferred, it is contemplated that other types of light sources may be substituted, as is known in the art.

The rows 34, 35 of diodes 32 can have different light color. For example, the row 34 can include white LEDs, while the row 35 can include LEDs of a different color, or of a mixture of colors. For example, in one embodiment, the row 35 includes both blue LEDs and white LEDs. The blue diodes and white diodes can be arranged so that there is a ratio of five blue diodes to every one white diode along the row 35. Of course, many different variations are possible.

Still in reference to FIGS. 4 and 5, the fixture 30 includes a connector 38, such as a female DC jack snap fit. A control box 40 is connected between the fixture 32 and the connector 38. The control box 40 includes a button or switch 42 that allows for control of which colored LEDs should be turned on. In addition, the control box 40 is programmed to allow for selection of a light sequence, described further below.

FIG. 5 shows an end view of the fixture 30. End components of the fixture 30 are visible at 44, 46, 47. The fixture 30 can be mounted to the cabinet 12 in a variety of ways, including with a stainless steel clip that fits over the outer periphery of the fixture 30.

The control box 40 includes button or switch 42, which actuates a cycle of projecting light of at least two different colors, for example, white light and blue light. The cycle will project colors using the LEDs along predetermined distance increments and time increments along the length of the tank arrangement 16, in order to show different colored lights into different individual ones of the tanks 14, in order to showcase the fish 15 in the tanks 14.

The light source 28 can project the light by cycling between white light and blue light, or any other pre-determined colors.

In one example, the light source includes a cycle of emitting a first light color (such as white light) into at a first of the individual tanks 14 and, simultaneously, a second light color (such as blue light) into at least a second of the individual tanks 14. The cycle can further include emitting the second light color (such as blue light) into the first of the individual tanks 14, and simultaneously, the first light color (such as white light) into the second individual tanks 14.

Attention is again directed to FIG. 3. The light fixture 30 is positioned for each row 20, 22, 24 to project colored light in all of the individual tanks 14 for the respective row. While FIG. 3 only shows the light fixture 30 for the upper row 20, and in reference to FIG. 2, it should be understood that middle row 22 has a light fixture 30 located behind cabinet panel 48, while the bottom row 24 includes a light fixture 30 located behind cabinet panel 50. The upper row 20 has the light fixture 30 located behind cabinet panel 52.

The light source 28 for each row 20, 22, 24 can be programmed for projecting a cycle of projecting light colors along predetermined distant increments along the length of each row 20, 22, 24. The cycle can include emitting a first light color into one or more of the individual tanks 14 in the respective row 20, 22, 24; and, simultaneously emitting second light color into one or more of the individual tanks 14 in the respective row 20, 22, 24. In addition, in some arrangements, it can be possible to have the light source 28 for each row 20, 22, 24 be programmed for projecting a cycle of projecting light colors along predetermined time increments along the length of each row 20, 22, 24, with the timing for each light varied or constant.

For example, in FIGS. 1 and 2, the upper row 20 has four individual tanks 14. The tank 54 on the far left has light projecting into it of a color that is different than the color of the light projecting into the other three tanks 55, 56, 57. For example, the tank 54 can have light being projected there into, while the tanks, 55-57 have blue light projecting into it. After time passes, the tank 54 can have blue light projecting into it, while the remaining tanks 55-57 can change to white, or remain blue.

In the middle row 22 there are three individual tanks 14. The tank on the far left at 59 is shown as having the same color light projecting into it as the middle tank 60, while the tank 61 on the far right has a different color light projecting into it. After a period of time, the color of the light projecting into the tanks 59-61 can change.

In the bottom row 24, all of the tanks 14 have the same color light projecting into it. Again, as with the other rows, the sequence of light colors shining into each particular tank can change.

The sequence of lights can be selected by pressing the button or switch 42 on the control box 40. The control box 40 can be programmed so that, depending on the sequentially pressing of the button, the lighting configuration can be changed. For example, the control box can be programmed as follows: if the button 42 is pressed once, all of the white diodes 32 are on. If the button 42 is pressed twice, then two thirds of the fixture 30, as it extends from left to right will light up the white diodes, while the blue diodes on the remaining one third are lit. If the button 42 is pressed three times, then the left one third of the fixture 30 has the white diodes, while the remaining two thirds of the fixture 30 has blue diodes lit. If the button 42 is pressed four times, then the entire light bar across the entire length has only blue diodes lit up. If pressed five times, the left two thirds of the fixture 20 has blue diodes lit, while the right one third has only white diodes lit. If pressed six times, the left one third of the light fixture 30 has only blue diodes lit, while the right two thirds of the fixture 30 has only white diodes lit. Of course, many different patterns and sequences are available.

The output of the colored light can be programed or be settable using an application executable on a mobile device, using techniques well known in the art.

The light source 28 as described herein can be used in a method of lighting aquarium system 10. The method includes projecting light into the tank arrangement 16, in which the tanks 14 are positioned side-by-side. The light has at least first and different colors. The method further includes cycling the light to project the first color into a first of the tanks, while projecting the second light color into a second of the tanks.

The method includes cycling the light such that the first light color is projected into the second of the tanks, while the second light color is projected into the first of the tanks. The step of cycling can also include, when there are three tanks positioned side-by-side, projecting the first light color into the first and second of the tanks, while projecting the second light into a third of the tanks.

The step of cycling can include changing the light color projecting into the tanks by a predetermined sequence. The predetermined sequence would be which light color is lit up for a predetermined amount of time, before the light color changes.

In preferred methods, the first light color is white light, and the second light color is blue light. Many variations are possible, and the lights can be other LED diode light colors such as red, yellow, purple, orange, violet, and further blends of these colors.

The above represents example principles. Many embodiments can be made using these principles.

What is claimed is:

1. A method of lighting an aquarium system comprising: (a) providing a cabinet holding at least one aquarium tank arrangement including a plurality of individual tanks positioned side-by-side; a light fixture mounted above the tank arrangement; the light fixture including at least two rows of LED lights both extending along a length of the tank arrangement; the LED lights each being colored one of at least blue, white, and red; (b) using an application executable on a mobile device, setting an output of the LED lights for a sequence of colors, distance increments of colors, and time increments of colors along the length of the tank arrangement; (c) projecting light from the light fixture into the plurality of individual tanks of the tank arrangement; and (d) actuating a cycle of the projecting light of at least two different colors along the length of the tank arrangement in, (i) predetermined distance increments; and (ii) predetermined time increments.

2. The method of claim 1 further including using a surface skimmer in the tank arrangement for water clarity.

3. The method of claim 1 wherein the step of providing a cabinet includes providing the light fixture to have LED lights that vary with color in segments along the length of the light fixture.

4. The method of claim 1 wherein the step of providing a cabinet includes providing the LED lights to be colored at least one of yellow, purple, orange, and violet.

5. The method of claim 1 wherein the step of projecting light into the aquarium tank arrangement includes projecting the light into an array of the plurality of individual tank positioned in rows and columns; and using a plurality of the light sources, at least one light source positioned for each row to project colored light in all of the individual tanks for the respective row.

* * * * *